United States Patent [19]

Sands

[11] Patent Number: 4,704,424

[45] Date of Patent: Nov. 3, 1987

[54] THERMOPLASTIC MATERIALS

[75] Inventor: Bruce W. Sands, Malvern, Pa.

[73] Assignee: PQ Corporation, Valley Forge, Pa.

[21] Appl. No.: 865,320

[22] Filed: May 21, 1986

[51] Int. Cl.$^4$ .......................... C08K 3/34; C08L 23/02
[52] U.S. Cl. ..................................... 524/450; 524/586
[58] Field of Search ................................ 524/450, 586

[56] References Cited

U.S. PATENT DOCUMENTS

| | | | |
|---|---|---|---|
| 4,250,081 | 2/1981 | Bode et al. | 524/450 |
| 4,307,010 | 12/1981 | Sandler et al. | 524/450 |
| 4,371,656 | 2/1983 | Kashiwase et al. | 524/450 |
| 4,464,504 | 8/1984 | Kocsis et al. | 524/450 |
| 4,487,810 | 12/1984 | Ascarelli et al. | 524/450 |
| 4,529,750 | 7/1985 | Gimpel | 524/450 |

FOREIGN PATENT DOCUMENTS

| | | | |
|---|---|---|---|
| 0014542 | 2/1981 | Japan | 524/450 |
| 0025346 | 2/1982 | Japan | 524/450 |
| 0028145 | 2/1982 | Japan | 524/450 |
| 0067638 | 4/1982 | Japan | 524/450 |
| 0063342 | 4/1982 | Japan | 524/450 |
| 0177070 | 9/1985 | Japan | 524/450 |

*Primary Examiner*—Herbert J. Lilling
*Attorney, Agent, or Firm*—Ernest G. Posner; Stephen Bobb; Fred C. Philpitt

[57] ABSTRACT

Various type A zeolites can be combined with thermoplastic materials to provide antiblock and improved optical properties to films or sheets of said thermoplastic. The zeolites are of less than full hydration, and at least a portion of the sodium is replaced with multivalent ions such as calcium and magnesium. The zeolites can also be acid treated to provide zeolites that contain hydronium ions.

1 Claim, No Drawings

THERMOPLASTIC MATERIALS

BACKGROUND OF THE INVENTION

This invention relates to the use of zeolite powders in sheets and films of thermoplastic resins as antiblock materials. In particular, zeolites of specific compositions are effective antiblocks and provide unexpected physical properties of the finished sheet or film.

Thermoplastic resins, such as polyolefins and the like, often find use as sheets and films. Such sheets are stacked and films are rolled in storage and use. The sheets and/or films are adherent and may be difficult or nearly impossible to separate for use. Various inorganic materials, such as silica or diatomaceous earth, can be incorporated into the resin prior to forming the sheet or film to prevent such adherence. These materials are called antiblocks, the adherence being called blocking.

U.S. Pat. No. 4,250,081 teaches that zeolite powders of various types can be used as antiblocks. This patent distinguishes zeolites over the prior art siliceous antiblock by indicating the zeolites to be hydrated, while the prior art materials must be nearly water-free, and zeolites can be blended with the thermoplastic more easily. The patent indicates that Zeolite A containing 24% water (fully hydrated) can be processed at over 170° C. to provide antiblock properties.

SUMMARY OF THE INVENTION

I have found that Zeolite A of less than full hydration and at least a portion of the sodium replaced by calcium, magnesium, hydronium or combinations thereof are very effective antiblocks and provide polymer films and sheets of excellent properties. I found that fully hydrated Zeolite NaA is not compatible with thermoplastic resins at the elevated temperatures required for incorporation and processing. Foaming and decomposition of the resin resulted. Foaming and decomposition are avoided when 50% or more of the sodium in Zeolite NaA is replaced with calcium, magnesium or hydronium ions and the water content is reduced below about 20%. These zeolites not only have good antiblock properties, but exhibit higher gloss and clarity with lower haze than films prepared using commercially acceptable antiblock agent.

THE INVENTION

Many thermoplastic resins or polymers can benefit from the use of my zeolite as an antiblock. Among others are polyolefins, polystyrene, polyvinyl halogens, polyvinylidene halogens, polyvinyl esters, polyacrylates, polyacrylamides, polyalkyl esters, polyvinyl ethers. Copolymers of these materials are also appropriate.

The zeolites required for compositions of my invention are crystalline aluminosilicates of the structure referred to as Zeolite A. The preparation and properties of these zeolites are described in detail in U.S. Pat. No. 2,882,243, among other sources. This patent is incorporated herein by reference. Generally, the preparation involves combining aqueous solutions that are sources of silica, alumina and sodium to produce a gel which crystallizes upon hydrothermal treatment. Conventional washing and drying steps provide hydrated Zeolite NaA. The hydrated Zeolite NaA can be treated to incorporate other metal ions into its structure. Calcium and magnesium replacement of sodium provides compatibility with organic polymers. Other multivalent metals can also be effective.

The Zeolite NaA must be modified with the substitution of multivalent ions for part or most of the sodium. The modification is carried out by ion exchange in aqueous solution using nearly any appropriate metal salt, such as chlorides, nitrates, sulfates and the like. The exchange can be carried out in any convenient manner that allows control of the amount of metal exchanged for sodium.

The zeolite required for my invention must have sufficient metal ion exchanged for sodium to achieve the desired compatibility with organic polymers. The exchange can be carried to any higher level desired, even up to 100%. I prefer the zeolite to have about 25 to 90% of the sodium replaced. I most prefer that about 50 to 85% be exchanged. The zeolites resulting from this process can be conveniently represented by the following notation:

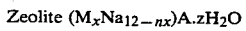

Zeolite $(M_xNa_{12-nx})A \cdot zH_2O$ wherein M is a multivalent metal of valence n, x can be about 2 to 6, with about 3 to 6 or about 4 to 6 corresponding to the preferred and most preferred levels of exchange and z is such that the zeolite contains 10 to 20% water.

The Zeolite NaA or the Zeolite $(M_xNa_{12-nx})A$ can be treated with hydronium ion $(H_3O^+)$ to provide zeolites that are compatible with polymers.

The Zeolite NaA or the exchanged zeolites are pH-adjusted by slurrying in water and adding acid slowly until the pH is between about 5.0 and 9.5. Mineral acids such as $H_2SO_4$ and HCl are usually used for this technique. The acidified slurry is aged for 30 to 90 minutes. Washing, filtering, and drying complete the preparation. The composition of zeolites treated in this manner is crystalline and can be represented as:

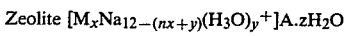

Zeolite $[M_xNa_{12-(nx+y)}(H_3O)_y^+]A \cdot zH_2O$ wherein M is a multivalent metal of valence n, x is about 0 to 6, y is about 0.6 to 5.3 and z is such that the zeolite contains 10 to 20% water.

The zeolites of my invention can be combined with thermoplastic polymers in any convenient manner as long as the zeolite particles are not substantially altered. Usually a master batch of polymer containing up to 60 or 70% of zeolite is prepared by blending at elevated temperatures. This master batch is then used to dose much larger batches of polymer at zeolite levels sufficient to provide the antiblock properties required. I prefer levels of 0.05 to 10% zeolite in the polymer, and I most prefer 0.05 to 1% zeolite.

The use of the zeolites as described provides good protection against blocking in thermoplastic sheets and films. The zeolites of my invention provide polymers of better optical properties, exhibiting less haze and higher gloss and clarity.

EXAMPLES

The following examples illustrate certain embodiments of my invention. These examples are not provided to establish the scope of the invention, which is described in the disclosure and recited in the claims. The proportions are in parts by weight (pbw) or percent by weight (% wt/wt) unless otherwise indicated.

Example 1

The incorporation of various Zeolite A materials into low-density polyethylene to serve as master batches was attempted using Banbury type compounding equipment. The loadings were approximately 20, 30 and 50%. A diatomaceous earth (commercially available product) was also processed. Fully hydrated Zeolite NaA (>24% H$_2$O) could not be satisfactorily processed. Zeolite NaA at 14% water and Zeolite CaA at 18.5% water could be processed easily. The diatomaceous earth was also processed easily, although the finished polymer had a distinct gray color and was not translucent. The polymer containing 50% Zeolite CaA had a distinct translucency.

Example 2

Master batches from Example 1 containing Zeolite NaA (14% H$_2$O) and Zeolite CaA (18.5% H$_2$O) were blended with additional low density polyethylene and formed into thin films containing approximately 1000 or 3000 ppm of the zeolite. The polymer containing the diatomaceous earth was also processed to form similar films. Antiblock and certain visual properties were tested for these films. The antiblock test was an empirical one wherein the water pressure required to force two adhering films apart indicates relative performance. The 45° gloss, transparency and haze were measured using ASTM methods D2457-70, D1746-60 and D1003-61, respectively. The results are summarized in the following table.

TABLE 1

| Antiblock Ingredient | Level (ppm) | 45° Gloss | Clarity | Haze | AntiBlock |
|---|---|---|---|---|---|
| Zeolite NaA | 1000 | 66.6 | 51.7 | 6.5 | 45.5 |
| (14% H$_2$O) | 3000 | 65.0 | 36.9 | 8.0 | 35.0 |
| Zeolite CaA | 1000 | 67.0 | 57.5 | 5.5 | 50.2 |
| (18% H$_2$O) | 3000 | 65.5 | 54.4 | 6.2 | 32.0 |
| Diatomaceous | 1000 | 65.5 | 47.2 | 5.8 | 39.9 |
| Earth | 3000 | 63.1 | 19.9 | 7.1 | 25.8 |

The antiblock properties of the Zeolite CaA were comparable to those for the Zeolite NaA while not quite as good as the commercial products. The optical properties of the Zeolite CaA were improved over both the Zeolite NaA and the commercial product.

I claim:

1. In a low density polyethylene polymer suitable for forming a sheet or film with antiblock properties, the said sheet or film comprising said polymer and a powdered zeolite, the improvement comprising the zeolite being of the following composition:

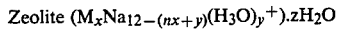

Zeolite $(M_x Na_{12-(nx+y)}(H_3O)_y^+) \cdot zH_2O$ wherein M is a multivalent metal of valence n, x is 0 to 6 and y is 0.6 to 5.3 and z is such that the zeolite contains 10 to 20% water.

* * * * *